US009118078B2

(12) United States Patent
Huang et al.

(10) Patent No.: US 9,118,078 B2

(45) Date of Patent: Aug. 25, 2015

(54) METHOD OF FORMING A FILM OF GRAPHITE OXIDE SINGLE LAYERS, AND APPLICATIONS OF SAME

(75) Inventors: Jiaxing Huang, Wilmette, IL (US); Laura J. Cote, Chicago, IL (US); Franklin J. Kim, Evanston, IL (US)

(73) Assignee: NORTHWESTERN UNIVERSITY, Evanston, IL (US)

(*) Notice: Subject to any disclaimer, the term of this patent is extended or adjusted under 35 U.S.C. 154(b) by 859 days.

(21) Appl. No.: 12/661,688

(22) Filed: Mar. 22, 2010

(65) Prior Publication Data

US 2010/0239869 A1 Sep. 23, 2010

Related U.S. Application Data

(60) Provisional application No. 61/161,988, filed on Mar. 20, 2009.

(51) Int. Cl.

*B32B 9/00* (2006.01)
*H01M 4/66* (2006.01)
*C01B 31/04* (2006.01)

(52) U.S. Cl.

CPC .......... *H01M 4/663* (2013.01); *C01B 31/0438* (2013.01); *H01M 4/667* (2013.01)

(58) Field of Classification Search

CPC .... B32B 9/00; C01B 31/0438; C01B 2204/00
USPC .................. 428/408; 423/447.1, 447.2, 448; 977/742; 252/510
See application file for complete search history.

(56) References Cited

U.S. PATENT DOCUMENTS

2005/0020759 A1* 1/2005 Gotou .......................... 524/495
2007/0092432 A1* 4/2007 Prud'Homme et al. ...... 423/448
2007/0284557 A1* 12/2007 Gruner et al. ................ 252/500
2010/0021708 A1* 1/2010 Kong et al. .................. 428/220
2010/0028681 A1* 2/2010 Dai et al. ...................... 428/408

OTHER PUBLICATIONS

Kim, Langmuir-Blodgett Films of Single Walled Carbon Nanotubes: layer by Layer and in plane Orientation of Tubes, Jpn. Appl. Phys. vol. 42 (2003) pp. 7629-7634.*

Hummers, W. S. et al., Preparation of Graphitic Oxide, J. Am. Chem. Soc., 1958, 80, 1339.

Nakajima, T. et al., A New Structure Model of Graphite Oxide, Carbon, 1988, 26, 3, 357-361.

Nakajima, T. et al., Formation Process and Structure of Graphite Oxide, Carbon, 1994, 32, 3, 469-475.

He, H. et al., Solid-State NMR Studies of the Structure of Graphite Oxide, J. Phys. Chem., 1996, 100, 19954-19958.

(Continued)

*Primary Examiner* — Daniel H Miller

(74) *Attorney, Agent, or Firm* — Locke Lord LLP; Tim Tingkang Xia, Esq.

(57) ABSTRACT

A method for forming a film of graphite oxide single layers. In one embodiment, the method includes the steps of preparing a solution of graphite oxide to allow a plurality of graphite oxide single layers to be formed and dispersed in the solution; and applying the solution of graphite oxide onto an air-water interface of water to form a film at the air-water interface, wherein the film comprises a plurality of graphite oxide single layers and is characterized by a packing density, wherein the film of graphite oxide single layers is formed with no presence of a surfactant or stabilizing agent.

21 Claims, 10 Drawing Sheets
(5 of 10 Drawing Sheet(s) Filed in Color)

a b c f d e

Edge-to-edge

Face-to-face Face-to-face $U$ Stable colloids (c) $d$ Reversible flocculation (d) Irreversible coagulation (e)

(56) References Cited

OTHER PUBLICATIONS

Lerf, A. et al., Structure of Graphite Oxide Revisited, J. Phys. Chem. B, 1998, 102, 4477-4482.
Stankovich, S. et al., Graphene-based composite materials, Nature, 2006, 442, 282-286.
Stankovich, S. et al., Stable aqueous dispersions of graphitic nanoplatelets via the reduction of exfoliated graphite oxide in the presence of poly(sodium 4-styrenesulfonate), J. Mater. Chem., 2006, 16, 155-158.
Becerril, H. A. et al., Evaluation of Solution-Processed Reduced Graphene Oxide Films as Transparent Conductors, ACS Nano, 2008, 2, 3, 463-470.
Li, X. et al., Chemically Derived, Ultrasmooth Graphene Nanoribbon Semiconductors, Science, 2008, 319, 1229-1232.
Dikin, D. A. et al., Preparation and characterization of graphene oxide paper, Nature, 2007, 448, 457-460.
Gilje, S. et al., A Chemical Route to Graphene for Device Applications, Nano Lett., 2007, 7, 11, 3394-3398.
Eda, G. et al., Large-area ultrathin films of reduced graphene oxide as a transparent and flexible electronic material, Nature Nanotech., 2008, 3, 270-274.
Li, D. et al., Processable aqueous dispersions of graphene nanosheets, Nature Nanotech., 2008, 3, 101-105.
Ruoff, R., Calling all chemists, Nature Nanotech., 2008, 3, 10-11.
Sun, F. et al., Spontaneous Polymer Thin Film Assembly and Organization Using Mutually Immiscible Side Chains, J. Am. Chem. Soc., 1996, 118, 1856-1866.
Reitzel, N. et al., Self-Assembly of Conjugated Polymers at the Air-Water Interface. Structure and Properties of Langmuir and Langmuir-Blodgett Films of Amphiphilic Regioregular Polythiophenes, J. Am. Chem. Soc., 2000, 122, 5788-5800.
Collier, C. P. et al., Reversible Tuning of Silver Quantum Dot Monolayers Through the Metal-Insulator Transition, Science, 1997, 277, 1978-1981.
Kim, F. et al., Langmuir-Blodgett Nanorod Assembly, J. Am. Chem. Soc., 2001, 123, 4360-4361.
Tao, A. et al., Langmuir-Blodgett Silver Nanowire Monolayers for Molecular Sensing Using Surface-Enhanced Raman Spectroscopy, Nano Lett., 2003, 3, 9, 1229-1233.
Whang, D. et al., Large-Scale Hierarchical Organization of Nanowire Arrays for Integrated Nanosystems, Nano Lett., 2003, 3, 9, 1255-1259.
Kovtyukhova, N. I., Layer-by-Layer Assembly of Ultrathin Composite Films from Micron-Sized Graphite Oxide Sheets and Polycations, Chem. Mater., 1999, 11, 771-778.
Danauskas, S. M. et al., Monitoring x-ray beam damage on lipid films by an integrated Brewster angle microscope/xray diffractometer, Rev. Sci. Instrum., 2007, 78, 103705.
Hwa, T. et al., Conformation of graphite oxide membranes in solution, Phys. Rev. A, 1991, 44, 4, R2235-R2238.
Wen, X. et al., Crumpled and collapsed conformations in graphite oxide membranes, Nature, 1992, 355, 426-428.
Lipp, M. M. et al., Design and performance of an integrated fluorescence, polarized fluorescence, and Brewster angle microscope/Langmuir trough assembly for the study of lung surfactant monolayers, Rev. Sci. Instrum., 1997, 68, 6, 2574-2582.
Stankovich, S. et al., Synthesis of graphene-based nanosheets via chemical reduction of exfoliated graphite oxide, Carbon, 2007, 45, 1558-1565.
Ybert, C. et al., Collapse of a Monolayer by Three Mechanisms, J. Phys. Chem. B, 2002, 106, 2004-2008.
Wang, X. et al., Transparent, Conductive Graphene Electrodees for Dye-Sensitized Solar Cells, Nano Lett., 2008, 8, 1, 323-327.
Wang, X. et al., Transparent Carbon Films as Electrodes in Organic Solar Cells, Angew. Chem. Int. Ed., 2008, 47, 2990-2992.
Eda, G. et al., Transparent and conducting electrodes for organic electronics from reduced graphene oxide, Appl. Phys. Lett., 2008, 92, 233305.
Jones, R.A.L., Soft Condensed Matter, 1st ed.; Oxford University Press: 2002.
Hamley, I.W., Introduction to Soft Matter: Polymers, Colloids, Amphiphiles and Liquid Crystals. 2nd ed.; Wiley: 2007; p. 340.
Israelachvili, J.N., Intermolecular and Surface Forces. 2nd ed.; Academic Press: 1992; p. 450.
Franklin, B.; Smyth, A.H., The Writings of Benjamin Franklin. Macmillan: New York, London, 1905; p. 10.
Abraham, F.F.; Goulian, M., Diffraction from Polymerized Membranes: Flat vs. Crumpled. Europhys. Lett., 1992, 19, 293-296.

* cited by examiner

METHOD OF FORMING A FILM OF GRAPHITE OXIDE SINGLE LAYERS, AND APPLICATIONS OF SAME

CROSS-REFERENCE TO RELATED PATENT APPLICATION

This application claims priority to and the benefit of, pursuant to 35 U.S.C. §119(e), U.S. provisional patent application Ser. No. 61/161,988, filed Mar. 20, 2009, entitled "TWO DIMENSIONAL ASSEMBLY OF GRAPHITE OXIDE SINGLE LAYERS, AND APPLICATIONS OF SAME," by Jiaxing Huang, Laura Cote and Franklin Kim, the contents of which is incorporated herein in its entirety by reference.

Some references, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, superscript "n" represents the nth reference cited in the reference list. For example, ( )[23] represents the $23^{rd}$ reference cited in the reference list, namely, Kim, F.; Kwan, S.; Akana, J.; Yang, P., *J. Am. Chem. Soc.* 2001, 123, 4360-4361.

FIELD OF THE INVENTION

The present invention relates generally to graphite oxide single layers, in particular, to methods of forming a film of graphite oxide single layers, and applications of same.

BACKGROUND

Graphite oxide (GO) is usually made by reacting graphite powder with strong oxidants such as a mixture of concentrated sulfuric acid and potassium permanganate.[1] After oxidation, the carbon sheets are exfoliated and derivatized by carboxylic acid at the edges, phenol hydroxyl and epoxide groups mainly at the basal plane.[2-5] The reaction breaks the pi-pi conjugation at those sites, which can be partially recovered by either chemical or thermal methods to yield graphene.[6-9] Recently, GO has rapidly risen to be a promising material for polymer composite and graphene related electronics applications.[6, 9-14] A graphite oxide single layer (GOSL) consists of a hexagonal network of covalently linked carbon atoms with oxygen containing functional groups attached to various sites (FIG. 1*a, b*). It can be viewed as an unconventional type of soft material[15, 16] in that it is a two-dimensional (2D) membrane-like single polymer molecule that also acts like colloid. The colloidal "particle" is characterized by two abruptly different length scales with the thickness determined by a single atomic layer and the lateral sheet extending to up to tens of micrometers. This renders GOSLs very high aspect ratio and nominal surface area since a single layer is essentially completely surface. It is of both scientific curiosity and technical importance to know how these atomically thin sheets assemble and how they behave when interacting with each other, and how to better make them.

Therefore, a heretofore unaddressed need exists in the art to address the aforementioned deficiencies and inadequacies.

SUMMARY OF THE INVENTION

In one aspect, the present invention provides a method for forming a film of graphite oxide single layers. In one embodiment, the method includes the steps of:

preparing a solution of graphite oxide to allow a plurality of graphite oxide single layers to be formed and dispersed in the solution; and applying the solution of graphite oxide onto an air-water interface of water to form a film at the air-water interface, wherein the film comprises a plurality of graphite oxide single layers and is characterized by a packing density, wherein the film of graphite oxide single layers is formed with no presence of a surfactant or stabilizing agent.

A plurality of graphite oxide single layers in the film of graphite oxide single layers each is in monolayer form. In one embodiment, the method further includes the step of compressing the film of graphite oxide single layers transversally to tune the packing density of the film. The packing density of the film can range from (a) dilute monolayers of isolated graphite oxide single layers, to (b) closely-packed monolayers without adjacent monolayers of graphite oxide single layers touching each other, to (c) over-packed monolayers with monolayers of isolated graphite oxide single layers folded at interconnecting edges, and to (d) over-packed monolayers with folded and partially overlapped monolayers of isolated graphite oxide single layers interlocking with each other.

In one embodiment, the preparing step of the method comprises the step of dissolving graphite oxide in a solvent to obtain a solution of graphite oxide. Many solvents may be utilized to practice the present invention. In one embodiment, the solvent is methanol, and the ratio of water to methanol is about 1:5.

In one embodiment, the method further includes the step of transferring the film of graphite oxide single layers to a solid substrate. Moreover, the step of transferring has the steps of:

immersing the solid substrate in the mixture of the solution and water such that the solid substrate is underneath the film of graphite oxide single layers at the air-water interface; and pulling the solid substrate up to allow at least part of the film of graphite oxide single layers to be in contact with a surface of the solid substrate such that the surface of the solid substrate is at least partially coated with a layer of graphite oxide single layers.

In one embodiment, the surface of the solid substrate is hydrophilic, and the solid substrate is selected from the group consisting of silicon, glass, quartz, and mica.

In one embodiment, the method further includes the steps of:

drying the solid substrate after the pulling step;

subsequently immersing the solid substrate in the mixture of the solution and water such that the solid substrate is underneath the film of graphite oxide single layers at the air-water interface to allow the surface that is at least partially coated with a layer of graphite oxide single layers to be proximate to the film of graphite oxide single layers at the air-water interface; and pulling the solid substrate up to allow at least part of the film of graphite oxide single layers to be in contact with the at least partially coated surface of the solid substrate such that the surface of the solid substrate is at least partially coated with another layer of graphite oxide single layers.

From this embodiment, the steps set forth immediately above can be repeated one or more times to coat additional one or more layers of graphite oxide single layers over the at least partially coated surface of the solid substrate.

In another aspect, the present invention provides an article of manufacture made by the method as set forth immediately above.

In a further aspect, the present invention provides a method for forming conducting film of graphene from a film of graphite oxide single layers. In one embodiment, the method includes the steps of:

preparing a solution of graphite oxide to allow a plurality of graphite oxide single layers to be formed and dispersed in the solution;

applying the solution of graphite oxide onto an air-water interface of water to form a film at the air-water interface, wherein the film comprises a plurality of graphite oxide single layers and is characterized by a packing density;

providing a substrate with a hydrophilic surface;

immersing the substrate in the mixture of the solution and water such that the substrate is underneath the film of graphite oxide single layers at the air-water interface to allow the hydrophilic surface to be proximate to the film of graphite oxide single layers at the air-water interface;

pulling the substrate up to allow at least part of the film of graphite oxide single layers to be in contact with the hydrophilic surface of the substrate such that the hydrophilic surface of the substrate is at least partially coated with a layer of graphite oxide single layers; and reducing chemically the layer of graphite oxide single layers coated on the hydrophilic surface of the substrate to a conducting film of graphene, wherein the film of graphite oxide single layers is formed with no presence of a surfactant or stabilizing agent.

In yet another aspect, the present invention provides an article of manufacture made by the method as set forth immediately above.

In another aspect, the present invention provides an article of manufacture with at least one conducting film of graphene. In one embodiment, the article of manufacture has:

a substrate;

at least one conducting film of graphene; and at least two electrodes formed in electrical contact with the at least one conducting film of graphene, wherein the at least one conducting film of graphene is reduced chemically from a film of graphite oxide single layers coated on a surface of the substrate, wherein the film of graphite oxide single layers is coated on the surface of the substrate by Langmuir-Blodgett assembly, and wherein the graphite oxide single layers is formed with no presence of any surfactant or stabilizing agent.

In one embodiment, the substrate is selected from the group consisting of silicon, glass, quartz, and mica.

These and other aspects of the present invention will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The drawings described below are for illustration purposes only. The drawings are not intended to limit the scope of the present teachings in any way. The patent or application file may contain at least one drawing executed in color. If so, copies of this patent or patent application publication with color drawing(s) will be provided by the Office upon request and payment of the necessary fee.

DETAILED DESCRIPTION

Figure 1:
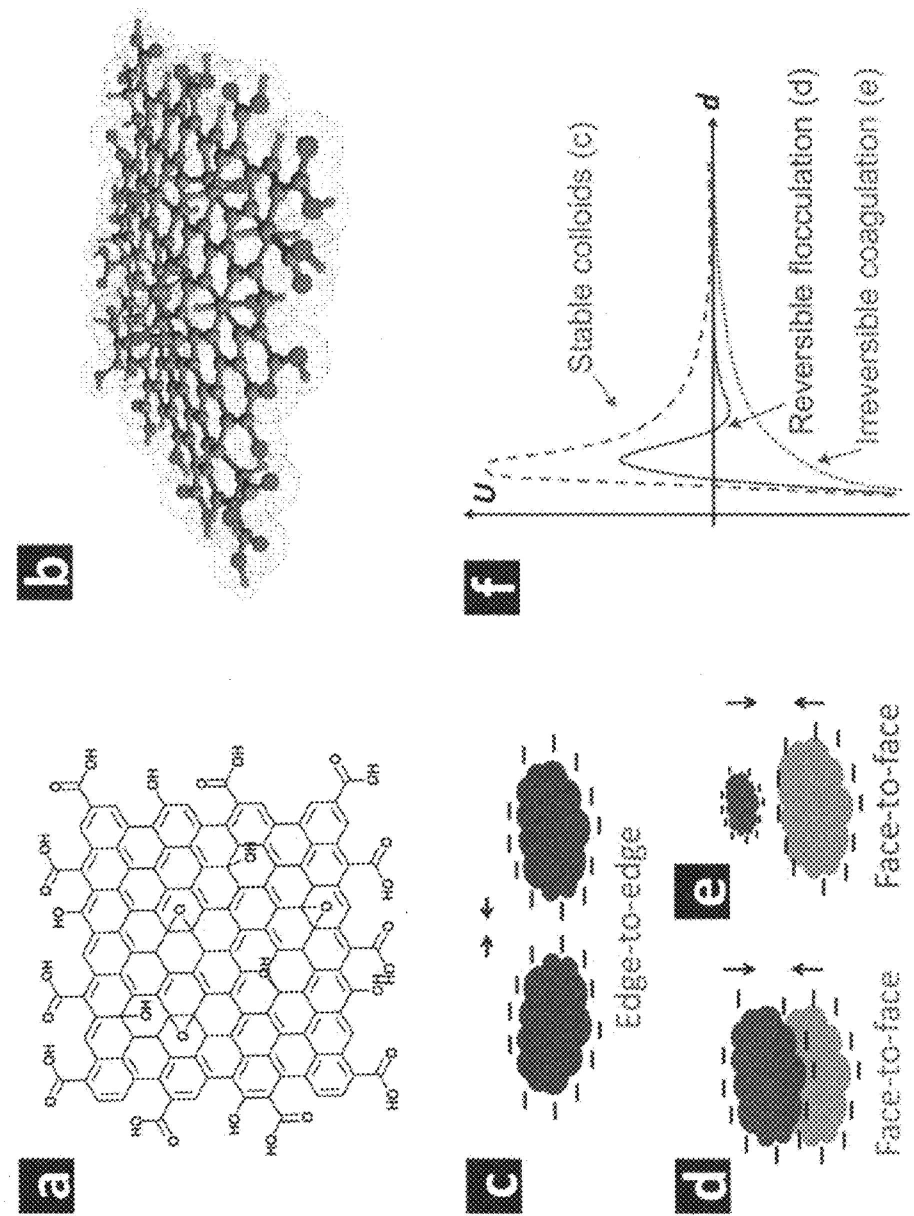
FIG. 1 shows (a) Structural model and (b) a three dimensional (3D) view of a GOSL showing carboxylic acid groups at the edge, phenol hydroxyl and epoxide groups mainly at the basal plane.[3, 5] There are two fundamental interacting geometries when two single layers meet: edge to edge (c) and face to face (d, e), respectively. The sheets are negatively charged on their edge due to ionized carboxylic acid groups. The competition between electrostatic repulsion and van der Waals attraction determines the colloidal stability of such interacting systems. Edge to edge interaction as shown in (c) should be stable against flocculation or coagulation due to strong repulsion and weak attraction. With increased van der Waals attraction, face to face interaction may lead to reversible flocculation of (d) GOSLs of comparable sizes, or irreversible coagulation of (e) GOSLs of very different sizes. These scenarios correspond to the three classical types of DLVO colloidal stability, whose schematic total potential energy versus separation profiles are shown in (f).[15-17] it is noted that in FIG. 1, dashed line corresponds to strongly repelling colloids; solid line corresponds to kinetically stable colloids forming reversible flocculation; and dotted line corresponds to unstable colloid forming coagulation, respectively.

The present invention is more particularly described in the following examples that are intended as illustrative only since numerous modifications and variations therein will be apparent to those skilled in the art. Various embodiments of the invention are now described in detail. Referring to the drawings, FIGS. 1-10, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

Definitions

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, if any, the term "atomic force microscope (AFM)" or scanning force microscope (SFM) refers to a very high-resolution type of scanning probe microscope, with demonstrated resolution of fractions of a nanometer, more than 1000 times better than the optical diffraction limit. The term "microscope" in the name of "AFM" is actually a misnomer because it implies looking, while in fact the information is gathered or the action is taken by "feeling" the surface with a mechanical probe. The AFM in general has a microscale cantilever with a tip portion (probe) at its end that is used to scan the specimen surface. The cantilever is typically silicon or silicon nitride with a tip radius of curvature on the order of nanometers. When the tip is brought into proximity of a sample surface, forces between the tip and the sample lead to a deflection of the cantilever according to Hooke's law. The AFM can be utilized in a variety of applications.

As used herein, if any, the term "scanning electron microscope (SEM)" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

Overview of the Invention

The present invention provides, among other things, a method for forming a film of graphite oxide single layers. Single layer of graphite oxide can be viewed as an unconventional type of soft material and has recently been recognized as a promising material for composite and electronics applications. It is of both scientific curiosity and technical importance to know how these atomically thin sheets assemble. According to various embodiments of the present invention, there are two fundamental geometries of interacting single layers: "edge to edge" interaction, where two GOSLS are neighboring to each other laterally, and "face to face" interaction, where GOSLS are neighboring to each other vertically. Such interactions were studied at air-water interface by Langmuir-Blodgett assembly. Stable monolayers of graphite oxide single layers were obtained without the need for any surfactant or stabilizing agent, due to the strong electrostatic repulsion between the 2D confined layers. Such repulsion also prevented the single layers from overlapping during compression, leading to excellent reversibility of the monolayers. In contrast to molecular and hard colloidal particle monolayers, the single layers of GO tend to fold and winkle at edges to resist collapsing into multilayers. The monolayers can be transferred to a substrate, readily creating large area of flat graphite oxide single layers in the form of a film. The density of such films can be continuously tuned from dilute, close packed to over packed monolayers of interlocking single layers. For size mis-matched single layers of GO, the face-to-face interaction caused irreversible stacking, leading to double layers. The film of graphite oxide single layers, which are in the form of monolayers, can be chemically reduced to graphene for electronic application such as transparent conducting thin films according to various embodiments of the present invention Thus, in one aspect, the present invention provides a method for forming a film of graphite oxide single layers. In one embodiment, the method includes the steps of preparing a solution of graphite oxide to allow a plurality of graphite oxide single layers to be formed and dispersed in the solution, and applying the solution of graphite oxide onto an air-water interface of water to form a film at the air-water interface, wherein the film comprises a plurality of graphite oxide single layers and is characterized by a packing density. According to various embodiments of the present invention, the film of graphite oxide single layers is formed with no presence of a surfactant or stabilizing agent.

A plurality of graphite oxide single layers in the film of graphite oxide single layers each is in monolayer form. In one embodiment, the method further includes the step of compressing the film of graphite oxide single layers transversally to tune the packing density of the film. The packing density of the film can range from (a) dilute monolayers of isolated graphite oxide single layers, to (b) closely-packed monolayers without adjacent monolayers of graphite oxide single layers touching each other, to (c) over-packed monolayers with monolayers of isolated graphite oxide single layers folded at interconnecting edges, and to (d) over-packed monolayers with folded and partially overlapped monolayers of isolated graphite oxide single layers interlocking with each other.

In one embodiment, the preparing step of the method comprises the step of dissolving graphite oxide in a solvent to obtain a solution of graphite oxide. Many solvents may be utilized to practice the present invention. In one embodiment, the solvent is methanol, and the ratio of water to methanol is about 1:5.

In one embodiment, the method further includes the step of transferring the film of graphite oxide single layers to a solid substrate. Moreover, the step of transferring has the steps of immersing the solid substrate in the mixture of the solution and water such that the solid substrate is underneath the film of graphite oxide single layers at the air-water interface, and pulling the solid substrate up to allow at least part of the film of graphite oxide single layers to be in contact with a surface of the solid substrate such that the surface of the solid substrate is at least partially coated with a layer of graphite oxide single layers.

In one embodiment, the surface of the solid substrate is hydrophilic, and the solid substrate is selected from the group consisting of silicon, glass, quartz, and mica.

In one embodiment, the method further includes the steps of:

drying the solid substrate after the pulling step;

subsequently immersing the solid substrate in the mixture of the solution and water such that the solid substrate is underneath the film of graphite oxide single layers at the air-water interface to allow the surface that is at least partially coated with a layer of graphite oxide single layers to be proximate to the film of graphite oxide single layers at the air-water interface; and pulling the solid substrate up to allow at least part of the film of graphite oxide single layers to be in contact with the at least partially coated surface of the solid substrate such that the surface of the solid substrate is at least partially coated with another layer of graphite oxide single layers.

From this embodiment, the steps set forth immediately above can be repeated one or more times to coat additional one or more layers of graphite oxide single layers over the at least partially coated surface of the solid substrate. Other coating methods known to people skilled in the art may also be utilized to practice this aspect of the present invention.

In another aspect, the present invention provides an article of manufacture, such as a film of GOSLS, made by the method as set forth immediately above.

In a further aspect, the present invention provides a method for forming conducting film of graphene from a film of graphite oxide single layers. In one embodiment, the method includes the steps of:

preparing a solution of graphite oxide to allow a plurality of graphite oxide single layers to be formed and dispersed in the solution;

applying the solution of graphite oxide onto an air-water interface of water to form a film at the air-water interface, wherein the film comprises a plurality of graphite oxide single layers and is characterized by a packing density;

providing a substrate with a hydrophilic surface;

immersing the substrate in the mixture of the solution and water such that the substrate is underneath the film of graphite oxide single layers at the air-water interface to allow the hydrophilic surface to be proximate to the film of graphite oxide single layers at the air-water interface;

pulling the substrate up to allow at least part of the film of graphite oxide single layers to be in contact with the hydrophilic surface of the substrate such that the hydrophilic surface of the substrate is at least partially coated with a layer of graphite oxide single layers; and reducing chemically the layer of graphite oxide single layers coated on the hydrophilic surface of the substrate to a conducting film of graphene.

According to various embodiments of the present invention, the film of graphite oxide single layers is formed with no presence of a surfactant or stabilizing agent.

A plurality of graphite oxide single layers in the film of graphite oxide single layers each is in monolayer form. In one embodiment, the method further includes the step of compressing the film of graphite oxide single layers transversally to tune the packing density of the film. The packing density of the film can range from (a) dilute monolayers of isolated graphite oxide single layers, to (b) closely-packed monolayers without adjacent monolayers of graphite oxide single layers touching each other, to (c) over-packed monolayers with monolayers of isolated graphite oxide single layers folded at interconnecting edges, and to (d) over-packed monolayers with folded and partially overlapped monolayers of isolated graphite oxide single layers interlocking with each other.

In one embodiment, the preparing step of the method includes the step of dissolving graphite oxide in a solvent to obtain a solution of the graphite oxide. Many solvents may be utilized to practice the present invention. In one embodiment, the solvent is methanol, and the ratio of water to methanol is about 1:5.

The substrate can be made from different materials. In one embodiment, the substrate is selected from the group consisting of silicon, glass, quartz, and mica.

In one embodiment, the method further includes the step of drying the substrate after the pulling step.

In one embodiment, the reducing step set forth above comprises the step of exposing the coated substrate to hydrazine vapor.

In yet another aspect, the present invention provides an article of manufacture, such as a conducting film of graphene, made by the method as set forth immediately above.

Figure 6:
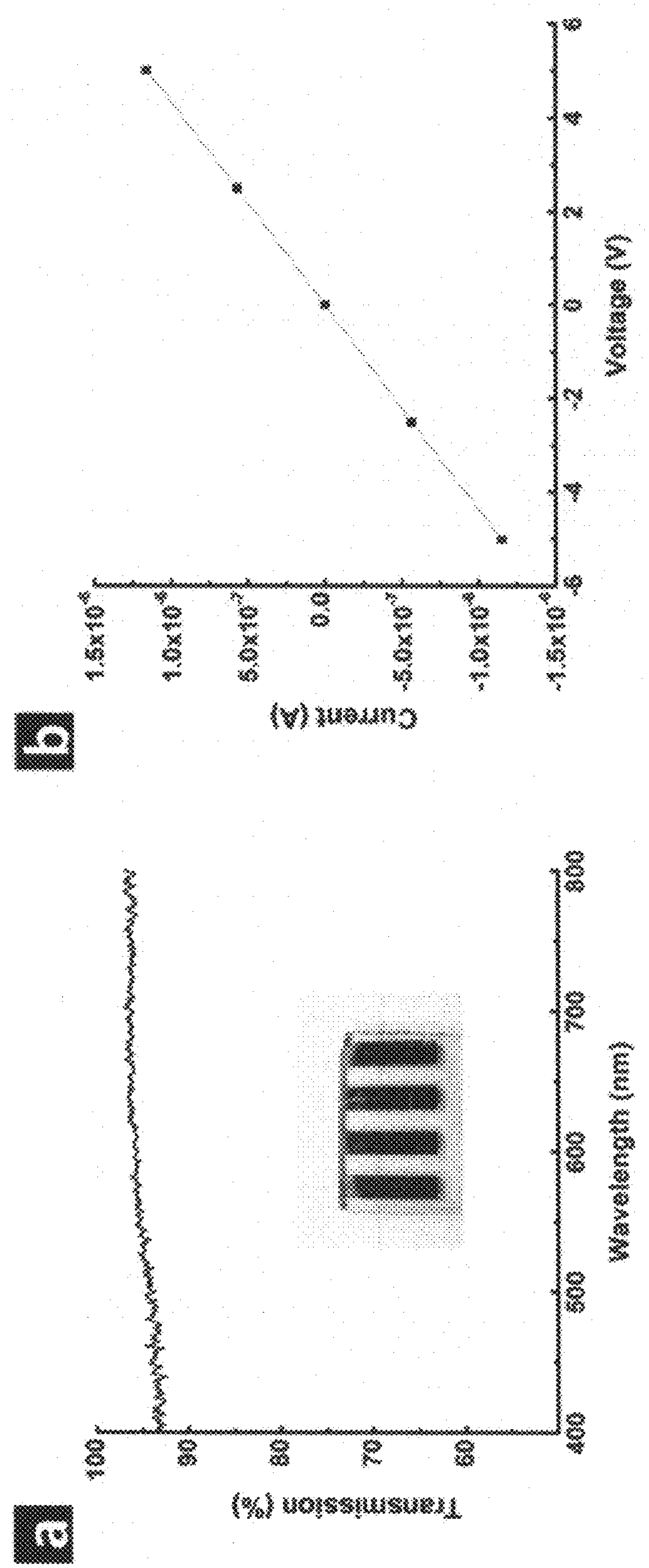
FIG. 6 shows according to one embodiments of the present invention a transparent conducting thin film obtained by chemical reduction of an over packed, interlocking GOSL monolayer such as those collected from region (d) of the isotherm plot in FIG. 2: (a) Transmission spectrum of such a thin film deposited on glass slide (inset) according to one embodiment of the present invention showing an average of 95.4% transmittance in the visible region; and (b) Current-voltage plot of the same film obtained by four point measurement.

In another aspect, the present invention provides an article of manufacture with at least one conducting film of graphene. The article of manufacture can be one of various types of electronic devices. In one embodiment, the article of manufacture has a substrate, at least one conducting film of graphene, and at least two electrodes formed in electrical contact with the at least one conducting film of graphene, wherein the at least one conducting film of graphene is reduced chemically from a film of graphite oxide single layers coated on a surface of the substrate, wherein the film of graphite oxide single layers is coated on the surface of the substrate by Langmuir-Blodgett assembly, and wherein the graphite oxide single layers is formed with no presence of any surfactant or stabilizing agent. In one embodiment as shown in the inset of FIG. 6(*a*), such an article of manufacture is shown with a four electrodes configuration.

In one embodiment, the substrate is selected from the group consisting of silicon, glass, quartz, and mica.

Additional details are set forth below.

Examples

Aspects of the present teachings may be further understood in light of the following examples, which should not be construed as limiting the scope of the present teachings in any way.

The interaction between colloidal particles determines their colloidal stability. The three classical types of DLVO stability of charged colloidal particles are illustrated in FIG. 1(*f*) by the schematic total energy (U) versus particle separation (d) curves.[15-17] A colloidal dispersion is stable if the electrostatic repulsion dominates. Its potential energy curve has a high energy barrier against flocculation or coagulation (dashed line). If van der Waals attraction dominates, the colloids are unstable and tend to coagulate irreversibly since there is no repelling barrier on the total energy curve (dotted line). If the sum of repulsion and attraction generates a secondary minimum (solid line), the colloids remain kinetically stable. Their flocculation (the state at the secondary minimum) can be reversed by agitation. GO is known to form colloidal solution in water due to electrostatic repulsion between the ionized carboxylic and phenol hydroxyl groups. These groups are located mainly at the edges and so are the charges. When two GOSLs approach each other, they experience both electrostatic repulsion and van der Waals attraction. Their total energy (U) is a sum of these two potentials. Due to their highly anisotropic shape, the total potential energy of two interacting GOSLs should depend on the geometry in which they approach each other. As set forth above, there are two fundamental interacting geometries between GOSLs: the “edge to edge” interaction and the “face to face” interaction, as shown in FIGS. 1(*c*)-(*e*). Note that the scaling law of van der Waals potential versus separation ($1/d^n$) depends on the geometry of the interacting bodies as set forth in the following table.

| Two points | Two parallel chains | Two parallel planes |
|---|---|---|
| $W \sim 1/d^6$ | $W \sim 1/d^5$ | $W \sim 1/d^2$ |

Figure 7:
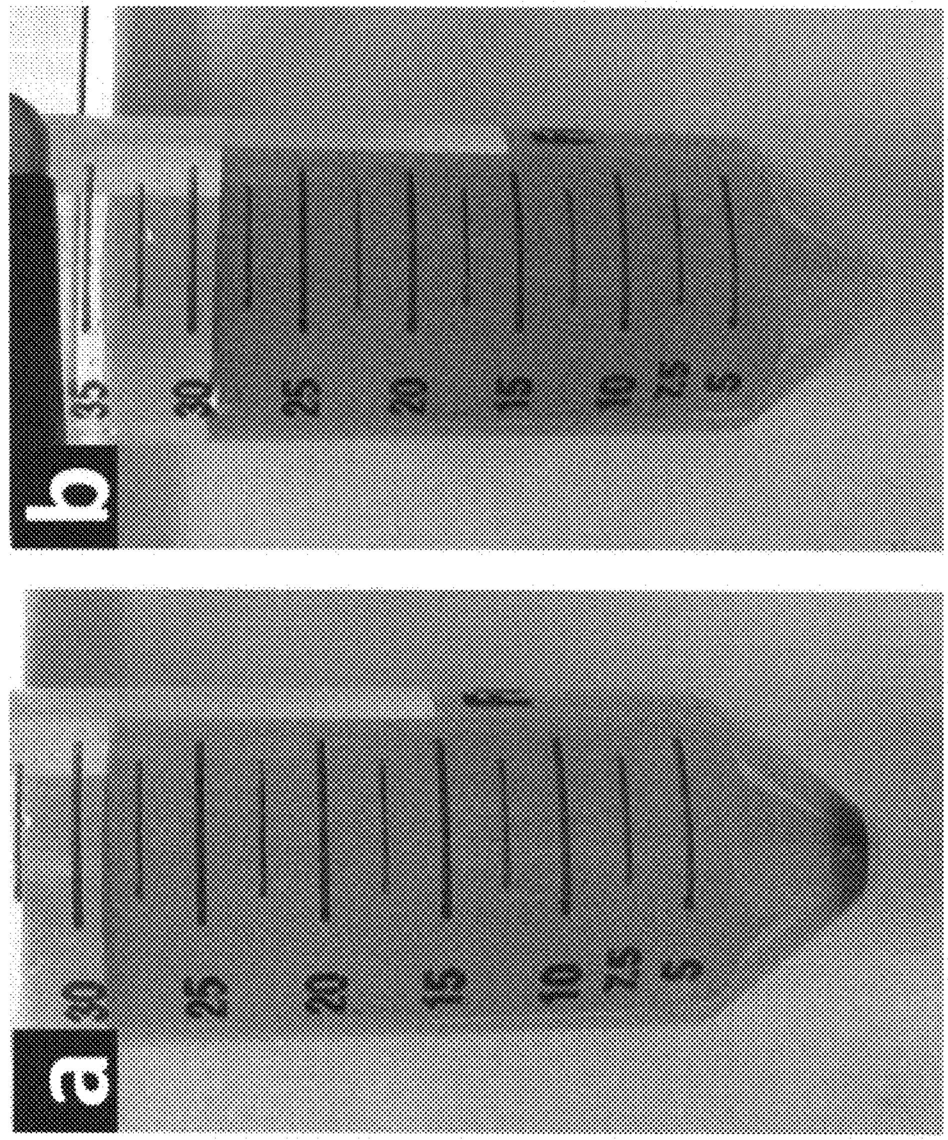
FIG. 7 shows GO colloidal solutions tend to form flocculation during storage as shown in (a), which can be re-dispersed by shaking or mild sonication (b), respectively.

Therefore, the colloidal stability of GOSLs should also depend on their interacting geometry. When two flat sheets of GOSLs, where GOSLs each are in the form of monolayer, are brought together in an edge-to-edge manner, as shown in FIG. 1(*c*), their van der Waals potential should scale in a way between those of two atoms ($1/d^6$) and two chains ($1/d^5$), which rapidly decays as the separation increases. Therefore, the electrostatic repulsion should dominate leading to a potential energy curve without minimum similar to the dashed line in FIG. 1(*f*). This suggests that GOSLs would form a stable colloidal dispersion against flocculation or coagulation if they are confined in 2D space. If the sheets are brought together in a face-to-face manner, their van der Waals potential now scales with ($1/d^2$). In addition, the residual pi-conjugated domains in the sheets can contribute to the attraction, too. Then it should be possible to see a shallow energy minimum before the repelling barrier on the curve, similar to the solid line in FIG. 1(*f*). This would lead to reversible stacking when GOSLs are forced to overlay with other. It is indeed in agreement with the observation that GO colloidal solutions usually form flocculation during storage, which can be re-dispersed by shaking or gentle sonication, as shown in FIG. 7. The face-to-face interaction should also depend on the relative sizes of the sheets. When two GOSLs with very different sizes meet this way, the separation between the charges, which are mostly on the edges, is no longer represented by the physical separation of the layers. The closest distance between the sheets is limited by the size difference. Therefore, the repulsive potential has a finite minimum value due to the size mismatch, while the attractive potential can still scale continuously as the face-to-face separation decreases. This would lead to a potential energy curve without a repelling barrier, shown in FIG. 1(*f*) as the dotted line. The colloidal system would be unstable, therefore two such GOSLs should tend to stack near concentrically to form a double layer.

A water surface, which is two dimensional (2D), serves as an ideal platform to investigate the above mentioned interactions of GOSLs. First, the interface is geometrically similar to a GOSL, making it ideal to accommodate the flat sheets of GOSLs. Second, the 2D water surface effectively provides a soft, fluidic “substrate” that should allow free movement of GO sheets upon manipulation, which should facilitate interactions between the flat GO sheets in both edge-to-edge and face-to-face geometries. In one aspect of the present invention, Langmuir-Blodgett (LB) assembly of GOSLs was realized by various embodiments of the present invention. It was discovered in practicing the present invention that GOSLs can float on water surface without the need for surfactants or stabilizing agents. The GOSL monolayers exhibit remarkable reversibility against isothermal compression-expansion cycles. In contrast to molecular and hard colloidal particle monolayers, GOSLs tend to fold and winkle to resist collapsing into multilayers. In practicing the present invention, monolayers of flat GOSLs over large areas with continuously tunable density were successfully made according to various embodiments, which can be chemically converted to graphene for electronic applications such as transparent conductor thin films.[8, 11, 18]

Molecular monolayers floating at air-water interface have been a subject of extensive interest since the eighteenth century.[19] In a typical process for preparing Langmuir-Blodgett monolayers, amphiphilic molecules are first dissolved in a volatile organic solvent and then spread onto the water surface. As the solvent evaporates, the molecules are trapped on the water surface forming a monolayer. A moving barrier is then used to change the area of the monolayer thus effectively tuning the inter-molecular distance. As the film is compressed, it can undergo phase transitions from gas, liquid to solid phases before collapse into a multilayer. The film can be transferred to a solid substrate (e.g. by dip coating) forming monolayer coating over large area. The LB technique is not limited by small molecules; monolayers of polymers[20, 21] and nanomaterials[22-25] have been prepared in similar manner. According to various embodiments of the present invention, single layer graphite oxide itself can be viewed as a cross-linked molecular monolayer.[26] If these monolayers are placed on water surface, they can be collectively manipulated by the moving barrier. The GO sheets can then be pushed together edge-to-edge by compression. Face to face interaction may be induced in-situ by over compression, forcing GOSLs to slide on top of each other, or ex-situ through sequential, layer-by-layer dip coating. These types of interactions are important for understanding the properties of GO thin films as they affect surface roughness, porosity, packing density, etc. On the other hand, for the practical use of GO for graphene based electronics, it is critical to make large area, flat, single layer GO films. It was discovered according to various embodiments of the present invention, LB would be an ideal approach to achieve this.

Graphite Oxide (GO) Synthesis and Purification.

GO was prepared using a modified Hummer's method from graphite powders (Bay carbon, SP-1).[1, 7, 11, 27] In a typical reaction, 0.5 g of graphite, 0.5 g of $NaNO_3$ and 23 ml $H_2SO_4$ were stirred together in an ice bath. Then 3 g of $KMnO_4$ was slowly added. All chemicals were purchased from Sigma-Aldrich and were used as received. Once mixed, the solution is transferred to a 35±5° C. water bath and stirred for about 1 hr, forming a thick paste. 40 ml of water was then added and stirred for half an hour while the temperature was raised to 90±5° C. Finally, 100 ml water is added, followed by the slow addition of 3 ml $H_2O_2$ (30%), turning the color of the solution from dark brown to yellow. The warm solution was then filtered and washed with 100 ml water. The filter cake is then dispersed in water by mechanical agitation. Low speed centrifugation was done at 1000 rpm for 2 min. It was repeated until all visible particles were removed (about 3-5 times) from the precipitates. Then the supernatant underwent 2 more high speed centrifugation steps at 8000 rpm for 15 min to remove small GO pieces and water soluble by-products. The final sediment was re-dispersed in water with mechanical agitation or mild sonication using a table-top ultrasonic cleaner, giving a solution of exfoliated GO.

Langmuir-Blodgett (LB) Assembly of GO.

When the as-prepared aqueous solution of GO was directly applied onto water surface, most material sink into the subphase. However, it was found that methanol is a good solvent for the LB experiment since it disperses GO well and spreads on water surface rapidly. DI Water/methanol mixture with an optimal ratio of 1:5 was used for most LB experiments. After adding in methanol, the solution was sonicated for 30 minutes using a table top ultrasonic cleaner. The average size of the GO sheets can be controlled by the time of sonication. Two centrifugation steps were taken to further purify the sample. First, the solution was centrifuged at 8000 rpm for 20 min to further remove smaller GO sheets and by-products from the supernatant. The precipitate was collected and re-dispersed with 1:5=water/methanol solution. The solution was then centrifuged at 2500 rpm for 10 min to remove aggregates and larger GO sheets. The final supernatant contained well dispersed GO sheets with sizes in the range of about 5-20 μm. It was noted that such a solution of GO has a plurality of GOSLs formed and well dispersed therein.

For Langmuir-Blodgett experiments, the trough (Nima Technology, Model 116) was carefully cleaned with chloroform and then filled with DI water. GO solution was slowly spread onto the water surface drop-wise using a glass syringe. Generally, the solution was spread with speed of 100 μl/min up to a total of 8-12 ml. Surface pressure was monitored using a tensiometer attached to a Wilhelmy plate. Film of GO, or more precisely GOSLs, which are in the form of monolayer, with faint brown color could be observed at the end of compression. The film was compressed by barriers at a speed of 20 $cm^2$/min. The dimensions of the trough are 10 cm×25 cm. Typical initial and final surface areas were around 240 and 40 $cm^2$, respectively.

The film of GOSLs was transferred to substrates at various points during the compression by vertically dipping the substrate into the trough and slowly pulling it up (2 mm/min). As with the Langmuir-Blodgett deposition of other materials, effective transfer occurs when the meniscus spreads on the substrate during dip coating. It was discovered that hydrophilic surfaces are preferred for effectively collecting the graphite oxide single layers from the Langmuir-Blodgett film. Poor deposition was observed on hydrophobic surfaces obtained by silane treatment on silicon or glass. Therefore, only hydrophilic substrates were used in producing various observations disclosed herein. Typically silicon wafers were treated with 1:1:5=$NH_4OH$:$H_2O_2$:DI solution for 15 minutes to be more wettable by water. Other substrates used include glass, quartz and mica. Double layer of GO was prepared by depositing the first layer using the method described above, drying the substrate in an oven at 80° C. for 1 hour, and then doing the second deposition on the substrate using same conditions.

Characterization.

Brewster angle microscopy study was carried out on a home-made setup, which was described in great detail elsewhere.[28] The deposited film was characterized using SEM (Hitachi S-48000II) and AFM (Digital Instrument, Multi-Mode Scanning Probe). It was identified the proper set of conditions for reliably seeing single layers under SEM. All the SEM images were taken with low acceleration voltage (e.g., 0.8 kV) with high current (e.g., 20 μA). Under these conditions, single layers were readily visible and the contrast between single layer, double layer and multiple layers was apparent. AFM images recorded on the same samples confirmed the SEM observation. AFM images were taken with tapping mode at scanning rate of 1 Hz. The apparent heights of all the GO sheets observed were around 1 nm, which is consistent with previously reported values. GOSL films collected from the over packed region (region d in FIG. 1*f*) on glass slide was reduced to graphene by exposure to hydrazine vapor. The samples were placed in a sealed Petri dish with 100 μl of anhydrous hydrazine (98%, Sigma-Aldrich) for 18 hrs at room temperature. Then they were rinsed by DI water and dried in an 80° C. oven for 1 hour. Four gold electrodes with dimensions of 1.5 mm×7.5 mm×40 nm and 1.5 mm separation were patterned on the slides using a thermal evaporator and a shadow mask. The kV curves were obtained using a Keithley 2400 source meter on a homemade probe station. Transmission spectrum was measured in the areas between the electrodes using a fiber optics spectrometer (Ocean Optics, USB 2000). Spectroscopy data acquired at five different points were averaged to plot the spectrum in FIG. 6(*a*).

Average transmittance was calculated by averaging all the data points between 400 nm to 800 nm on the spectrum.

Results and Analysis.

The as-made GO colloidal dispersion was purified by several centrifugation and/or dialysis steps. The size of the GOSLs in thus treated samples was polydisperse, but typically larger than 5 microns in diameter. With minimal sonication treatment, large sheets of tens of microns can be obtained. In order to transfer the GO onto water surface, a volatile spreading solvent is needed. However, common water-immiscible spreading solvents, such as chloroform or toluene are not good for dispersing the hydrophilic GO. In addition, prior studies showed that GO tends to collapse and adopt three dimensional compact conformations in "poor", less polar solvents such as acetone.[29, 30] Therefore, it was chosen the simplest polar protic alcohol—methanol as the spreading solvent. The purified GO dispersion was therefore transferred into a 1:5 water/methanol mixture before spreading, and the GO colloids were found to be stable in this solution. Since LB monolayer is very sensitive to surface active impurities, all parts of the LB trough were thoroughly cleaned and tested before each experiment. Plasticware and rubber were avoided during the storage and handling of both the solvent and the dispersion to minimize contamination. The GO dispersion was carefully spread on the water surface drop-by-drop using a glass syringe. Usually a faint brown color can be observed. Then the monolayer was stabilized for about 20 minutes before isothermal compression. Surface pressure was monitored using a tensiometer equipped on the LB trough. The monolayer was transferred to silicon wafers, glass slides or mica disks by vertical dip coating and imaged by scanning electron microscope (SEM) and atomic force microscope (AFM).

Figure 2:
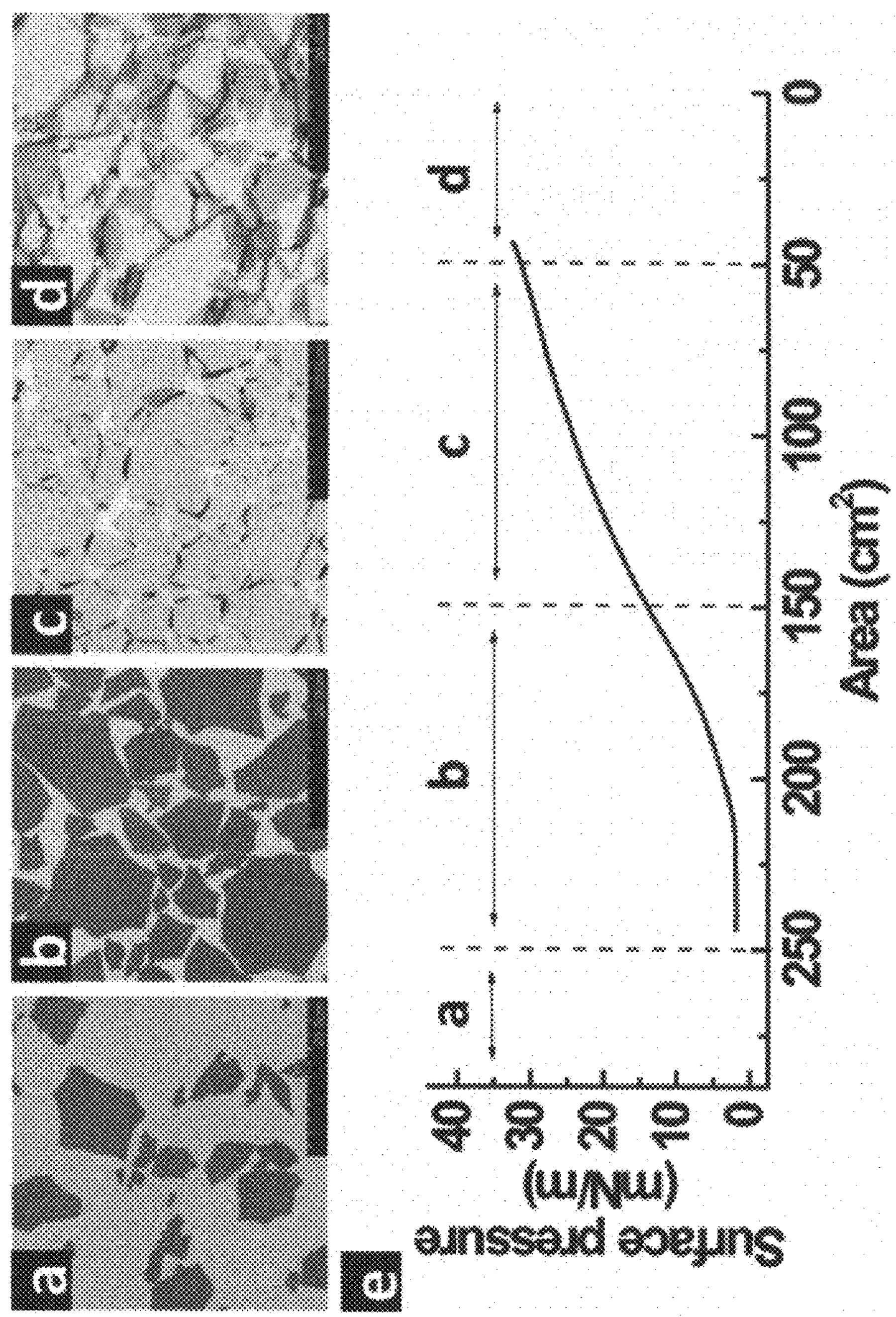
FIG. 2 shows Langmuir-Blodgett assembly of graphite oxide single layers according to one embodiment of the present invention: (a) to (d) are SEM images showing the collected graphite oxide monolayers on silicon wafer at different regions of the isotherm. The packing density was continuously tuned: (a) dilute monolayer of isolated flat sheets, (b) monolayer of close packed GO, (c) over packed monolayer with sheets folded at interconnecting edges and (d) over packed monolayer with folded and partially overlapped sheets interlocking with each other, and (e) is the isothermal surface pressure/area plot showing the corresponding a-d regions at which the monolayers were collected.
Figure 8:
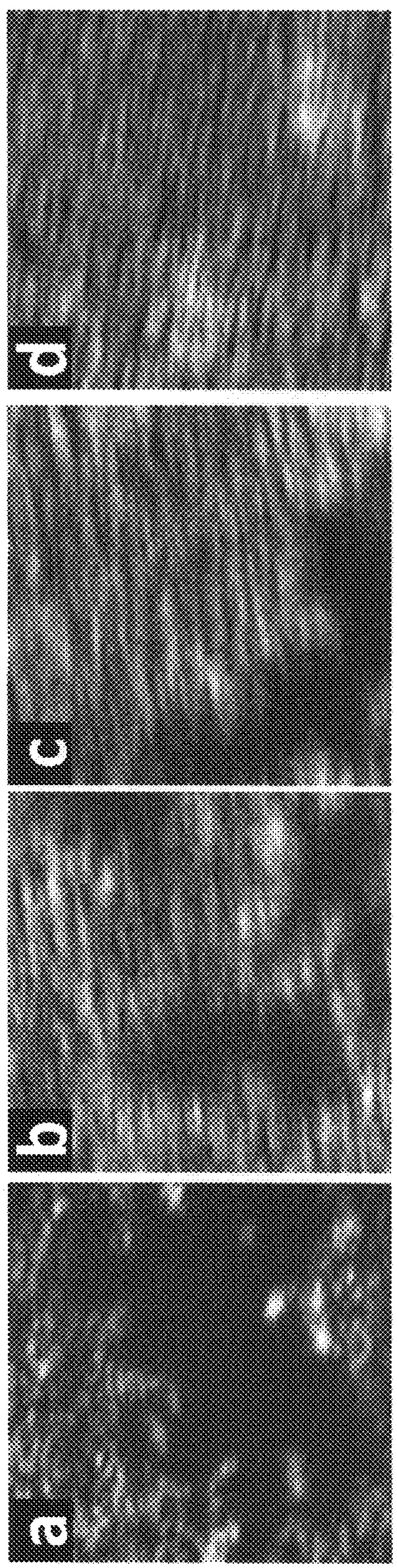
FIG. 8 shows snapshots from a video recorded by in-situ Brewster angle microscopy of the GO monolayer during isothermal compression. The presence of GO on the air-water interface altered the polarization station of incident beam thus giving the contrast of the images: from (a) to (d), the increased surface density of GO can be clearly seen as the film was compressed. The streaks in (b)-(d) were due to the movement of GO sheets at water surface during compression.

As the monolayer is compressed, slight darkening of the monolayer color can be observed, which is consistent with increased material density at water surface. To confirm that the GO sheets were indeed supported by the air-water interface rather than suspending near but beneath the surface, the monolayer was examined in-situ by the surface selective Brewster angle microscopy.[28, 31] Highly reflective shinning pieces were observed indicating the presence of micron sized, flat GO sheets, as shown in FIG. 8, at surface. The density of the sheets can be reversibly altered during the compression-expansion cycles. A gradual increase in surface pressure was recorded as the barrier was closed, as shown in the isothermal surface pressure—area plot in FIG. 2(*e*). SEM images of the monolayers collected at different stages of the plot clearly show 4 types of GO assembly. There was an initial gas phase where the surface pressure essentially remained constant during compression, which is shown as region a in FIG. 2(*e*). Monolayer collected at this stage consisted of dilute, well isolated, individual GO sheets as shown in FIG. 2(*a*). It is worth noting that most of the GO sheets were larger than 5 μm in diameter, yet all of them were flat. Prior methods for making GO thin films such as drop casting, spin coating,[8] spraying[11] or filtration[10, 12] usually produce wrinkled sheets even with sub-micron sizes.

Figure 3:
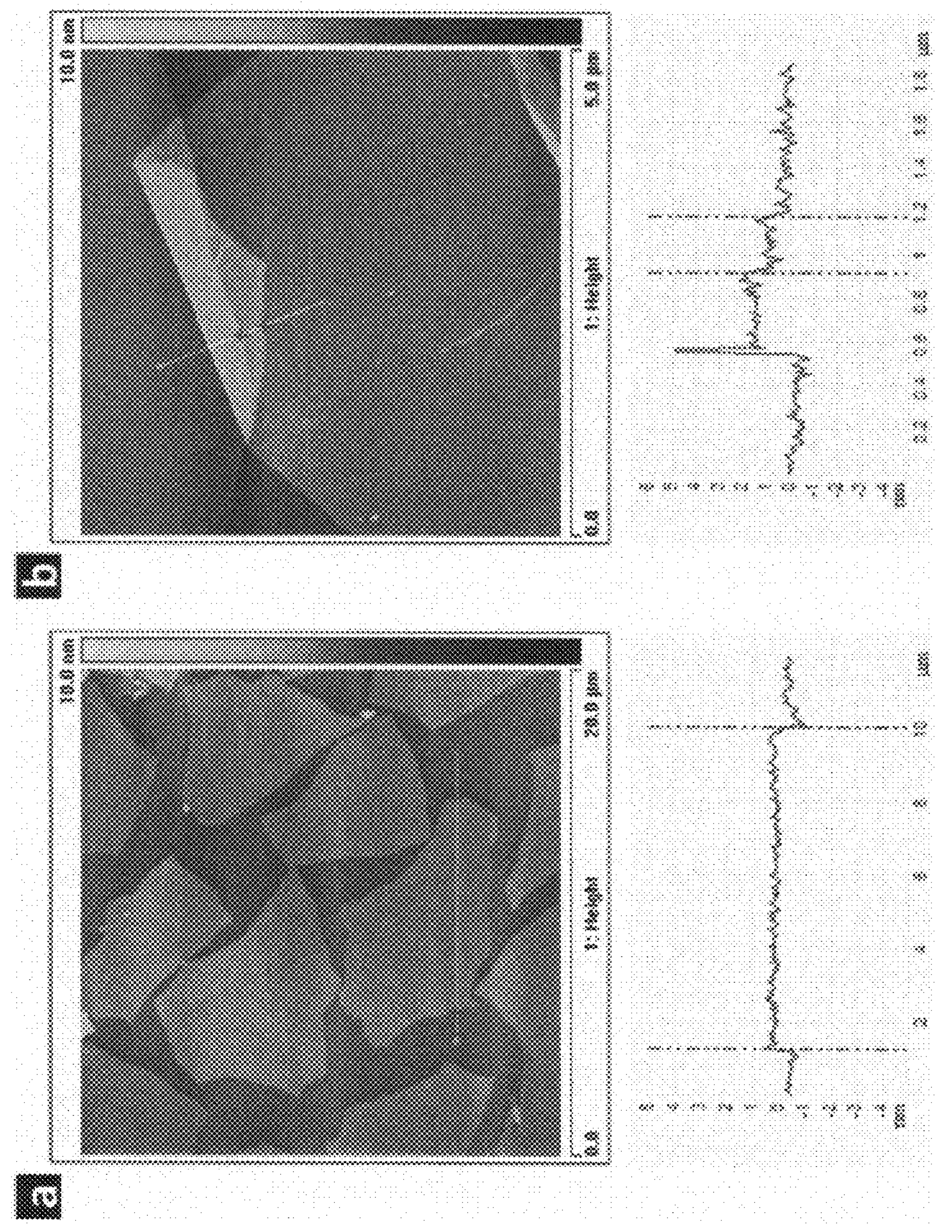
FIG. 3 shows AFM images of (a) a close packed graphite oxide monolayer, and (b) two touching GO sheets with folded edges on silicon wafer, respectively, according to various embodiments of the present invention. The thickness of the graphite oxide sheets were measured to be around 1 nm, as shown in the line scans. (a) and (b) were recorded on the same samples used for FIGS. 2(*b*) and 2(*c*), respectively.

As the area was decreased, the surface pressure started to rise and the GO sheets were pushed closer to each other. A few turning points were observed on the isotherm plot as the monolayer entered the condensed phase, reflecting different types of interactions of the single layers. At the first stage of pressure increase, which is shown in FIG. 2(*e*) as region b, the GO sheets started to "touch" each other and eventually formed a close packed monolayer, where they tiled the entire 2D surface as shown in FIG. 2(*b*). The increase in surface pressure is likely due to the electrostatic repulsion between the GO sheets. AFM images of the same monolayers on silicon wafer show uniform thickness of the GO sheets around 1 nm as shown in FIG. 3(*a*), which is consistent with previous reports.[11, 32] In close packed films, the gaps between two GO sheets were often too small to resolve using our AFM. This suggests that LB assembly may be used for making nano gaps between GO or graphene sheets. When the monolayer was further compressed beyond the close packed region, further increase in surface pressure was observed. This is in contrast to monolayers of small molecules or hard colloids, which would collapse into multilayers leading to constant or reduced surface pressure.[33] A striking interaction between the GO sheets was revealed by the SEM images as shown in FIG. 2(*c*). Instead of overlapping with each other, the GO sheets started to fold at the touching points along their edges. Since the single layers are soft and flexible, the increased surface pressure is thus dissipated by the folding and wrinkling of the edges, leaving the interior flat and essentially free of buckling or winkling. As shown in the AFM image in FIG. 3(*b*), the folds or wrinkles were usually much more than 2 nm, which would be the height for overlapped edges. They also produced a much higher contrast in the SEM images, marking the boundaries of the sheets. At this stage, the coverage of GO over the surface was much increased, yet the majority area of the monolayer was still flat. At even higher pressure, partial edge-overlapping was observed leading to a nearly complete monolayer of interlocked GOSLs as shown in FIG. 3(*d*). This edge-to-edge interaction mechanism continued to prevent the center of the GO sheets from wrinkling up to a point where there was no free space left in the monolayer. With the GO sheets interlocked with each other, the entire monolayer buckled like a whole piece of thin film upon further compression. Macroscopic winkles at millimeter scale can be seen by eye, which eventually led to the collapse of monolayer.

Figure 4:
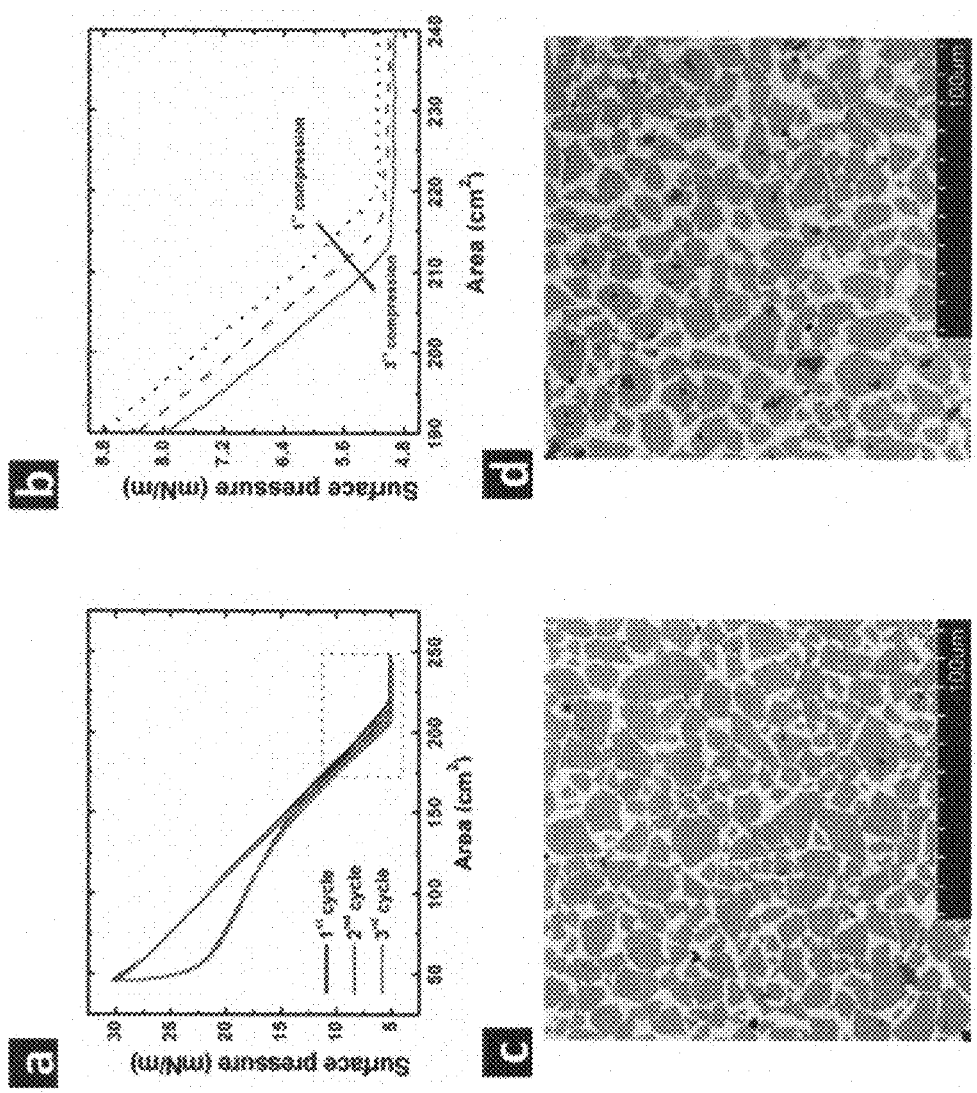
FIG. 4 shows the GOSL monolayer according to various embodiments of the present invention was highly reversible and stable against compression: (a) The isotherm plots of 3 sequential compression-expansion cycles. The 3 plots essentially overlapped with each other except in the early stage of compression as indicated with the dotted line box; (b) Close up view of the initial stage of compression reveals a shift of the plots to the lower area direction indicating materials loss at the air-water interface after isotherm cycles; (c) The SEM image of the monolayers before and (d) the SE image after cycling show that smaller graphite oxide sheets were pushed onto larger ones thus effectively reduced the amount of materials at the air-water interface. It also creates double layers of graphite oxide sheets.
Figure 5:
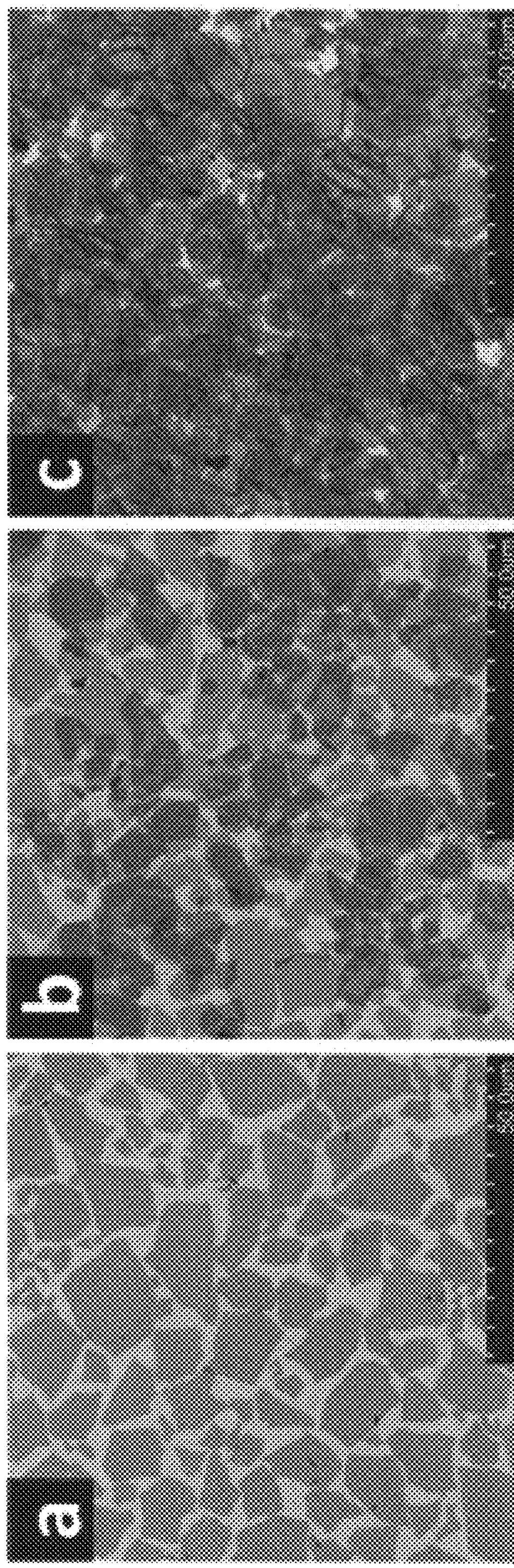
FIG. 5 shows layer by layer assembly of graphite oxide double layers of similar sizes according to various embodiments of the present invention in the SEM images: (a) Close packed single layer graphite oxide monolayer as the first layer; (b) Double layers with dilute top layer; and (c) Double layers with high density top later. The heavy degree of folding and wrinkling of the second layer in (c) suggests strong repulsion between the two layers.

Based on the total potential energy analysis as shown in FIGS. 1(*c*) and 1(*f*), LB films of GOSLs should be stable against flocculation or coagulation. The observed GOSL tiling behavior as shown in FIG. 2 is in good agreement with the hypothesis. The strong edge-to-edge repulsion resisted stacking or overlapping between layers even when the monolayer was compressed. In addition, the 2D GO monolayer did show excellent stability as they were essentially fully reversible after many cycles of compression-expansion as shown in FIG. 4. SEM study confirmed that the folds, wrinkles and partial overlapping observed during compression as shown in FIGS. 2(*d*) and 2(*c*) completely disappeared when the film was opened as shown in FIG. 4. Since the folding and overlapping would lead to partial face-to-face interaction, the disappearance of such structures upon monolayer expansion suggests that such interaction is not stable. In FIG. 4(*a*), it was shown representative surface pressure plots of 3 cycles of compression/expansion without collecting any samples. The curves have nearly the same shape and final pressure. However, there was a small shift of the gas-liquid phase transition point towards smaller area as the cycles continued as shown in FIG. 3(*b*). This indicates the loss of a small amount of material from the monolayer after each cycle. Close examination of the monolayer before and after cycling revealed many double layer structures consisting of a small GO sheet (<5 μm) on top of a much larger one as shown in FIGS. 4(*c*) and 4(*d*), respectively. Note that the small layer tended to completely overlap with the larger under layer. No partial overlapped double layers were observed. These small sheets were probably pushed onto the neighboring larger ones at high surface pressure. This introduced the face-to-face type of interaction as shown in FIG. 1(*e*). Once a small GO piece was pushed onto a large one, the electrostatic repulsion between the edges of the two sheets would lock them into completely overlapped or even near concentric arrangement. This double layer structure is further stabilized by van der Walls and residual pi-pi stacking between the faces of each sheet. The absence of double layers of similarly sized sheets and partially overlapped double layers after the surface pressure was released suggests that face-to-face interaction as shown in FIG. 1(*d*) between similarly sized single layers should be either unfavorable or reversible. Since GO samples obtained by oxidizing graphite particles are naturally polydisperse in size, one can take advantage of this unusual stacking behavior to make double layers or possibly even multilayers of GO by isothermal pressure-area cycling. Double layers were also made by sequential, layer-by-layer dip coating. The first layer was collected at close packed density, which was either aged in air overnight, or baked in an oven for about 1 hour to enhance its adhesion to the substrate. Then the second layer was deposited at various pressures. Double GO layers were successfully made. However, the second layer of GO sheets now experienced both repulsion from their neighbors and those in the under layer. As a result, the newly deposited second layer tended to be wrinkled, especially at high density as shown in FIG. 5. The density of the second layer was also lower than the first layer deposited at the same surface pressure.

Figure 9:
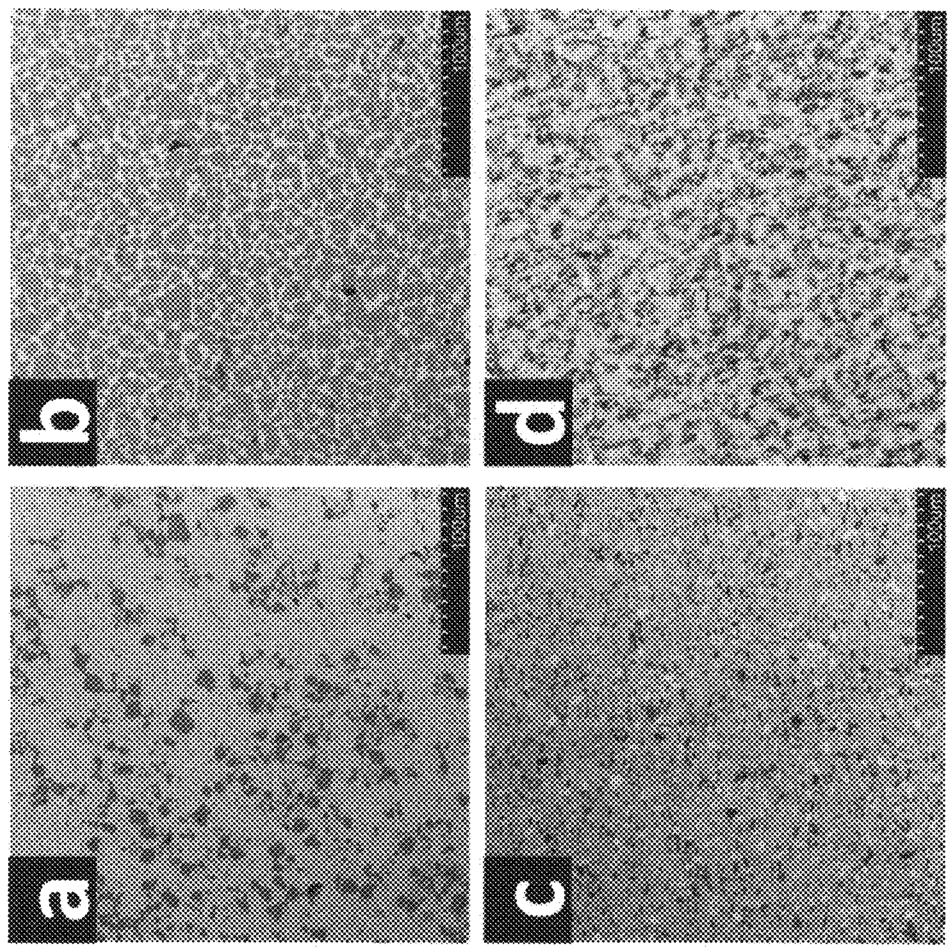
FIG. 9 shows lower magnification SEM image corresponding to those in FIG. 2 showing monolayers of (a) dilute GO sheets, (b) closed packed GO sheets, (c) over packed GO sheets connected with folded edges and (d) interlocked GO sheets over large areas.
Figure 10:
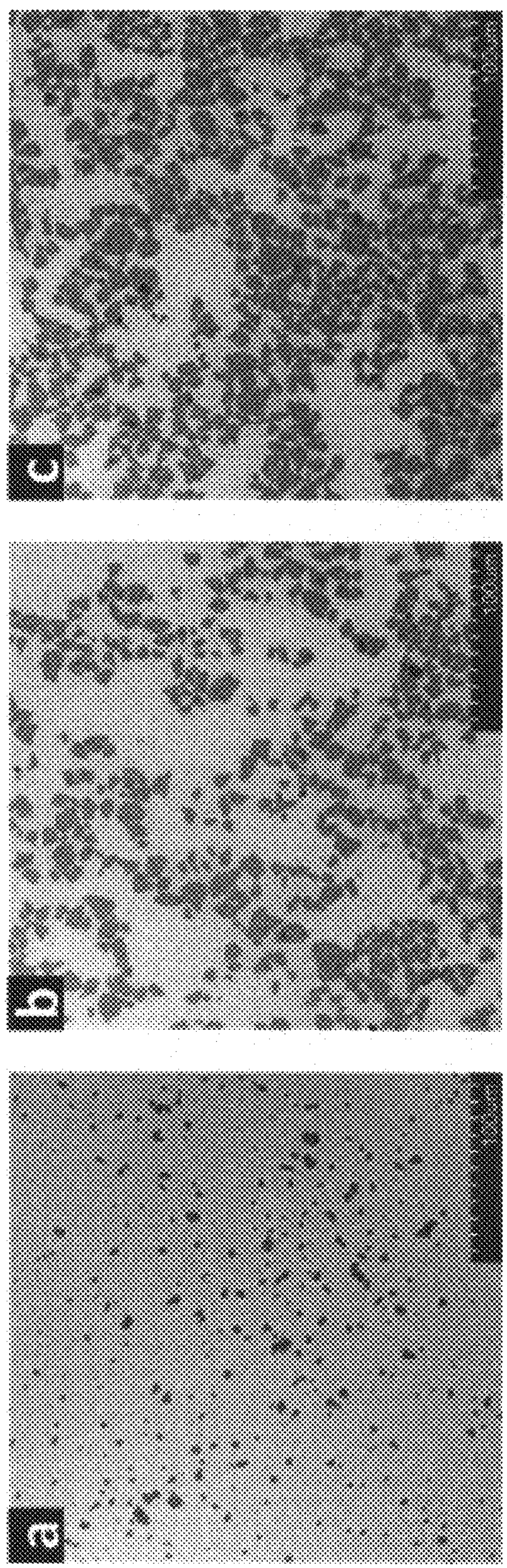
FIG. 10 shows effect of pulling speed on the packing density of GOSLs in the collected monolayer according to various embodiments of the present invention: (a) to (c) corresponds to pulling speed of 40 mm/min, 15 mm/min and 2 mm/min, respectively. All the monolayers were collected from a low surface pressure region.

The electrostatic repulsion between the GOSLs leads to the above mentioned edge-to-edge and face-to-face assembly behaviors. Both stacking and overlapping appeared to be unfavorable, which is actually beneficial for forming GOSL monolayers. It makes LB assembly a fairly robust 2D tiling technique for making high quality monolayers. In fact, the area of the surface monolayer in our experiment was on the order of 100 $cm^2$, which is already at the scale of a 4 inch wafer. Large areas of GO single layers can be collected at the desired surface pressure, yielding uniform coverage of different types of monolayers as shown in FIG. 9. Additional density control can be achieved by varying the pulling speed during LB transferring as shown in FIG. 10. The GO single layers can be reduced by the known methods (hydrazine, hydrogen or thermal annealing) to graphene.[7, 8] The close packed monolayers as shown in FIG. 2(*b*) would readily produce graphene wafers for large scale device fabrication. The over packed monolayers, as shown in FIGS. 2(*c*) and 2(*d*), respectively, already constitute continuous electrical pathways that can be potentially useful for transparent conductor applications.[8, 12, 34, 35] In one embodiment, a GOSL monolayer was collected at the over packed region of the pressure-area plot, which is the region d as shown in FIG. 2(*e*), on a glass slide. The film was chemically reduced to graphene by exposure to hydrazine vapor. Four gold electrodes were patterned onto film for electrical measurement as shown in the inset of FIG. 6(*a*). Transmission measurement showed that the film has an average of 95.4% transmittance in the visible region of the spectrum as shown in FIG. 6(*a*). As shown in FIG. 6(*b*), the current-voltage plot was obtained by four probe measurement. The sheet resistance was $1.9\times10^7$ ohm, which is comparable to previous reports on chemically reduced GO films.[8] The resistance can be reduced further by thermal treatment.[8]

Thus, by practicing various embodiments of the present invention, it was successfully demonstrated Langmuir-Blodgett assembly of GOSLs and made the following discoveries. Water supported monolayers of GOSLs can be made without any surfactant or stabilizing agent. The single layers formed stable dispersion against flocculation or coagulation when confined at the 2D air-water interface. The edge-to-edge repulsion between the single layers prevented them from overlapping during monolayer compression. The layers folded and winkled at their interacting edges at high surface pressure, leaving the interior flat. GOSL monolayers can be readily transferred to a solid substrate with density continuously tunable from dilute, close packed to over packed monolayers of interlocking sheets. When single layers of very different sizes were brought together face-to-face, they can irreversibly stack to form double layers. The monolayers can be readily imaged by SEM with high contrast between single and multilayers. The geometry dependant GOSL interaction revealed here should provide insight in the thin film processing of GO materials since the packing of GOSLs affects surface roughness, film porosity and packing density, etc. In addition, LB assembly readily creates large area monolayer of GOSL, which is a precursor for graphene based electronic applications.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCES

1. Hummers, W. S.; Offeman, R. E., *J. Am. Chem. Soc.* 1958, 80, 1339-1339.
2. Nakajima, T.; Mabuchi, A.; Hagiwara, R., *Carbon* 1988, 26, 357-361.
3. Nakajima, T.; Matsuo, Y., *Carbon* 1994, 32, 469-475.
4. He, H. Y.; Riedl, T.; Lerf, A.; Klinowski, J., *J. Phys. Chem.* 1996, 100, 19954-19958.
5. Lerf, A.; He, H. Y.; Forster, M.; Klinowski, J., *J. Phys. Chem. B* 1998, 102, 4477-4482.
6. Stankovich, S.; Dikin, D. A.; Dommett, G. H. B.; Kohlhaas, K. M.; Zimney, E. J.; Stach, E. A.; Piner, R. D.; Nguyen, S. T.; Ruoff, R. S., *Nature* 2006, 442, 282-286.
7. Stankovich, S.; Piner, R. D.; Chen, X. Q.; Wu, N. Q.; Nguyen, S. T.; Ruoff, R. S., *J. Mater. Chem.* 2006, 16, 155-158.
8. Becerril, H. A.; Mao, J.; Liu, Z.; Stoltenberg, R. M.; Bao, Z.; Chen, Y., *ACS Nano* 2008, 2, 463-470.
9. Li, X. L.; Wang, X. R.; Zhang, L.; Lee, S. W.; Dai, H. J., *Science* 2008, 319, 1229-1232.
10. Dikin, D. A.; Stankovich, S.; Zimney, E. J.; Piner, R. D.; Dommett, G. H. B.; Evmenenko, G.; Nguyen, S. T.; Ruoff, R. S., *Nature* 2007, 448, 457-460.
11. Gilje, S.; Han, S.; Wang, M.; Wang, K. L.; Kaner, R. B., *Nano Lett.* 2007, 7, 3394-3398.
12. Eda, G.; Fanchini, G.; Chhowalla, M., *Nature Nanotech.* 2008, 3, 270-274.
13. Li, D.; Muller, M. B.; Gilje, S.; Kaner, R. B.; Wallace, G. G., *Nature Nanotech.* 2008, 3, 101-105.
14. Ruoff, R., *Nature Nanotech.* 2008, 3, 10-11.
15. Jones, R. A. L., *Soft Condensed Matter.* 1st ed.; Oxford University Press: 2002.

16. Hamley, I. W., *Introduction to Soft Matter: Polymers, Colloids, Amphiphiles and Liquid Crystals* 2nd ed.; Wiley: 2007; p 340.
17. Israelachvili, J. N., *Intermolecular and Surface Forces.* 2nd ed.; Academic Press: 1992; p 450.
18. Eda, G.; Lin, Y.-Y.; Miller, S.; Chen, C.-W.; Su, W.-F.; Chhowalla, M., *Appl. Phys. Lett.* 2008, 92, 233305.
19. Franklin, B.; Smyth, A. H., *The writings of Benjamin Franklin*. Macmillan: New York, London, 1905; p 10 v.
20. Sun, F.; Castner, D. G.; Mao, G.; Wang, W.; McKeown, P.; Grainger, D. W., *J. Am. Chem. Soc.* 1996, 118, 1856-1866.
21. Reitzel, N.; Greve, D. R.; Kjaer, K.; Hows, P. B.; Jayaraman, M.; Savoy, S.; McCullough, R. D.; McDevitt, J. T.; Bjornholm, T., *J. Am. Chem. Soc.* 2000, 122, 5788-5800.
22. Collier, C. P.; Saykally, R. J.; Shiang, J. J.; Henrichs, S. E.; Heath, J. R., *Science* 1997, 277, 1978-1981.
23. Kim, F.; Kwan, S.; Akana, J.; Yang, P., *J. Am. Chem. Soc.* 2001, 123, 4360-4361.
24. Tao, A.; Kim, F.; Hess, C.; Goldberger, J.; He, R.; Sun, Y.; Xia, Y.; Yang, P., *Nano Lett.* 2003, 3, 1229-1233.
25. Whang, D.; Jin, S.; Wu, Y.; Lieber, C. M., *Nano Lett.* 2003, 3, 1255-1259.
26. Abraham, F. F.; Goulian, M., *Europhys. Lett.* 1992, 19, 293-296.
27. Kovtyukhova, N. I.; Ollivier, P. J.; Martin, B. R.; Mallouk, T. E.; Chizhik, S. A.; Buzaneva, E. V.; Gorchinskiy, A. D., *Chem. Mater.* 1999, 11, 771-778.
28. Danauskas, S. M.; Ratajczak, M. K.; Ishitsuka, Y.; Gebhardt, J.; Schultz, D.; Meron, M.; Lin, B. H.; Lee, K. Y. C., *Rev. Sci. Instrum.* 2007, 78, 103705.
29. Hwa, T.; Kokufuta, E.; Tanaka, T., *Phys. Rev. A* 1991, 44, R2235-R2238.
30. Wen, X.; Garland, C. W.; Hwa, T.; Kardar, M.; Kokufuta, E.; Li, Y.; Orkisz, M.; Tanaka, T., *Nature* 1992, 355, 426-428.
31. Lipp, M. M.; Lee, K. Y. C.; Zasadzinski, J. A.; Waring, A. J., *Rev. Sci. Instrum.* 1997, 68, 2574-2582.
32. Stankovich, S.; Dikin, D. A.; Piner, R. D.; Kohlhaas, K. A.; Kleinhammes, A.; Jia, Y.; Wu, Y.; Nguyen, S. T.; Ruoff, R. S., *Carbon* 2007, 45, 1558-1565.
33. Ybert, C.; Lu, W. X.; Moller, G.; Knobler, C. M., *J. Phys. Chem. B* 2002, 106, 2004-2008.
34. Wang, X.; Zhi, L. J.; Mullen, K., *Nano Lett.* 2008, 8, 323-327.
35. Wang, X.; Zhi, L. J.; Tsao, N.; Tomovic, Z.; Li, J. L.; Mullen, K., *Angew. Chem. Int. Ed.* 2008, 47, 2990-2992.

What is claimed is:

1. A method for the assembly of a film of graphite oxide single layers on a substrate, comprising the steps of:

(a) providing a trough, said trough containing a first water, the boundary between said first water and air being an air-water interface;

(b) providing a solution, said solution comprising graphite oxide single layers, a second water, and a polar protic alcohol;

(c) applying said solution to said air-water interface to form a film of graphite oxide single layers at a first packing density, said film of graphite oxide single layers at said first packing density more buoyant than said first water, said first packing density defined as the ratio of the surface pressure of said film of graphite oxide single layers at said first packing density to the unit area of said air-water interface;

(d) transversely compressing said film of graphite oxide single layers at said first packing density along a direction substantially parallel to said air-water interface to form a film of graphite oxide single layers at a second packing density, said film of graphite oxide single layers at said second packing density more buoyant than said first water, said second packing density defined as the ratio of the surface pressure of said film of graphite oxide single layers at said second packing density to the unit area of said air-water interface, said second packing density greater than said first packing density; and (e) moving along a direction substantially perpendicular to said air-water interface at least a portion of said substrate through said film of graphite oxide single layers at said second packing density to form said film of graphite oxide single layers on said substrate, wherein said film of graphite oxide single layers is formed on said substrate without use of a dissolved, adsorbed or covalently grafted surface active agent.

2. The method of claim 1 wherein said polar protic alcohol is chosen from the group consisting of ethanol and isopropanol.

3. The method of claim 1 wherein said polar protic alcohol is methanol.

4. The method of claim 3 wherein the ratio of methanol to said second water is about 1:5.

5. The method of claim 1 wherein said substrate is chosen from the group consisting of silicon, glass, quartz and mica.

6. The method of claim 1 wherein said substrate is surface treated plastic, said surface treated plastic being hydrophilic.

7. The method of claim 1 wherein said first packing density is about less than or equal to 0.1 $mN/m/cm^2$.

8. The method of claim 1 wherein said second packing density is greater than 0.1 $mN/m/cm^2$ and about less than or equal to 0.7 $mN/m/cm^2$.

9. The method of claim 1 further comprising the step of removing said film of graphite oxide single layers on said substrate from said film of graphite oxide single layers at said second packing density.

10. The method of claim 9 further comprising the step of drying said film of graphite oxide single layers on said substrate.

11. The method of claim 9 wherein said substrate is chosen from the group consisting of silicon, glass, quartz and mica.

12. The method of claim 1 wherein said substrate is surface treated plastic, said surface treated plastic being hydrophilic.

13. A method for the assembly of an electrically conductive film of graphene on a substrate, comprising the steps of:

(a) providing a trough, said trough containing a first water, the boundary between said first water and air being an air-water interface;

(b) providing a solution, said solution comprising graphite oxide single layers, a second water, and a polar protic alcohol;

(c) applying said solution to said air-water interface to form a film of graphite oxide single layers at a first packing density, said film of graphite oxide single layers at said first packing density more buoyant than said first water, said first packing density defined as the ratio of the surface pressure of said film of graphite oxide single layers at said first packing density to the unit area of said air-water interface;

(d) transversely compressing said film of graphite oxide single layers at said first packing density along a direction substantially parallel to said air-water interface to form a film of graphite oxide single layers at a second packing density, said film of graphite oxide single layers at said second packing density more buoyant than said first water, said second packing density defined as the ratio of the surface pressure of said film of graphite oxide single layers at said second packing density to the unit area of said air-water interface, said second packing density greater than said first packing density;

(e) moving along a direction substantially perpendicular to said air-water interface at least a portion of said substrate through said film of graphite oxide single layers at said second packing density to form a film of graphite oxide single layers on said substrate;

(f) removing said film of graphite oxide single layers on said substrate from said film of graphite oxide single layers at said second packing density;

(g) drying said film of graphite oxide single layers on said substrate; and (h) reducing said film of graphite oxide single layers on said substrate to form said electrically conductive film of graphene on said substrate, wherein said film of graphite oxide single layers is formed on said substrate without use of a dissolved, adsorbed or covalently grafted surface active agent.

14. The method of claim 13 wherein said polar protic alcohol is chosen from the group consisting of ethanol and isopropanol.

15. The method of claim 13 wherein said polar protic alcohol is methanol.

16. The method of claim 15 wherein the ratio of methanol to said second water is about 1:5.

17. The method of claim 13 wherein said first packing density is about less than or equal to 0.1 mN/m/cm$^2$.

18. The method of claim 13 wherein said second packing density is about greater than or equal to 0.7 mN/m/cm$^2$.

19. The method of claim 13 wherein said reducing step occurs by thermal annealing.

20. The method of claim 13 wherein said reducing step occurs by the use of a chemical-reductant.

21. The method of claim 20 wherein said chemical-reductant is chosen from the group consisting of hydrogen and hydrazine.

* * * * *